United States Patent
Tsubokura et al.

(10) Patent No.: US 11,242,580 B2
(45) Date of Patent: Feb. 8, 2022

(54) R-T-B BASED PERMANENT MAGNET

(71) Applicant: TDK CORPORATION, Tokyo (JP)

(72) Inventors: Taeko Tsubokura, Tokyo (JP); Takeshi Masuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/824,218

(22) Filed: Mar. 19, 2020

(65) Prior Publication Data
US 2020/0299813 A1    Sep. 24, 2020

(30) Foreign Application Priority Data

Mar. 22, 2019  (JP) .............................. JP2019-055414
Mar. 12, 2020  (JP) .............................. JP2020-043214

(51) Int. Cl.
*C22C 28/00* (2006.01)
*H01F 1/057* (2006.01)

(52) U.S. Cl.
CPC ............. *C22C 28/00* (2013.01); *H01F 1/057* (2013.01)

(58) Field of Classification Search
None
See application file for complete search history.

(56) References Cited

U.S. PATENT DOCUMENTS

2017/0103835 A1    4/2017  Hidaka et al.
2017/0103836 A1*   4/2017  Hidaka .................. C22C 38/06

FOREIGN PATENT DOCUMENTS

| JP | 2016184735    | * 10/2016 |
| JP | 2017-073465 A | 4/2017    |
| JP | 2018-093202 A | 6/2018    |

OTHER PUBLICATIONS

English language machine translation of JP2016184735. Generated Mar. 25, 2021. (Year: 2021).*

* cited by examiner

*Primary Examiner* — Brian D Walck
(74) *Attorney, Agent, or Firm* — Oliff PLC

(57) ABSTRACT

The present invention provides an R-T-B based permanent magnet having excellent magnetic properties and corrosion resistance even when Co content is small.
The R-T-B based permanent magnet in which R is a rare earth element including one or more selected from Nd and Pr and one or more selected from Dy and Tb, T is a combination of Fe and Co, and B is boron. The R-T-B based permanent magnet further includes Zr. A total content of Nd, Pr, Dy, and Tb is 30.00 mass % to 32.20 mass %, Co content is 0.30 mass % to 1.30 mass %, Zr content is 0.21 mass % to 0.85 mass %, and B content is 0.90 mass % to 1.02 mass % with respect to 100 mass % of the R-T-B based permanent magnet.

11 Claims, 1 Drawing Sheet

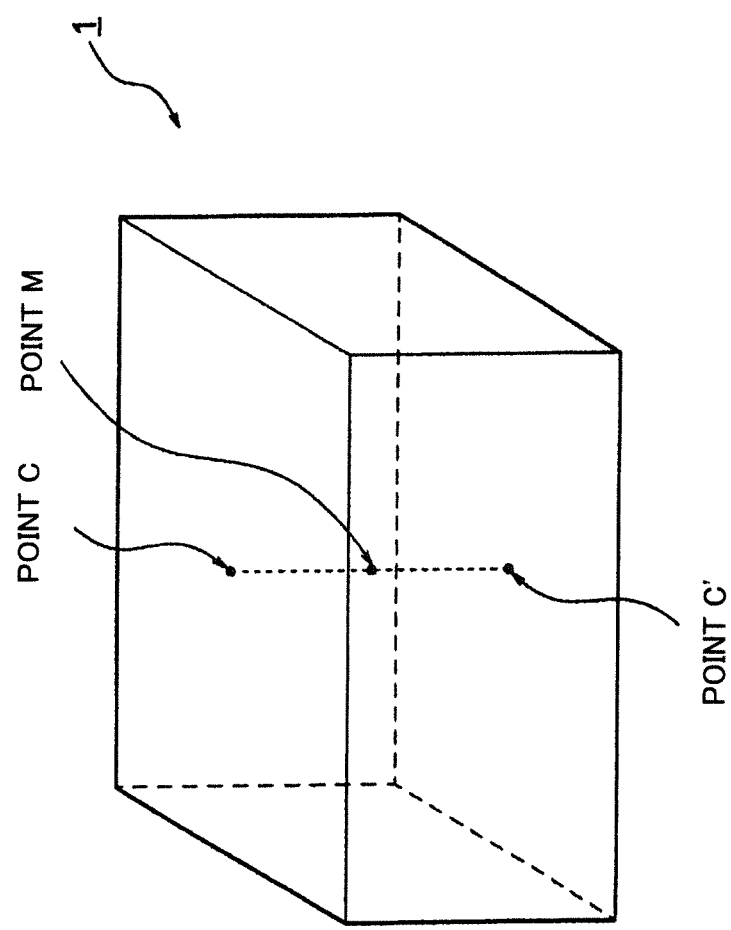

R-T-B BASED PERMANENT MAGNET

TECHNICAL FIELD

The present invention relates to an R-T-B based permanent magnet.

BACKGROUND

Patent Document 1 discloses an R-T-B based permanent magnet having high residual magnetic flux density and coercive force, and excellent corrosion resistance and production stability.

Patent Document 2 discloses high residual magnetic flux density and coercive force.

[Patent Document 1] JP Patent Application Laid Open. No 2017-73465

[Patent Document 2] JP Patent Application Laid Open. No 2018-93202

SUMMARY

The object of the present invention is to provide an R-T-B based permanent magnet having excellent magnetic properties and corrosion resistance even when Co content is low.

An R-T-B based permanent magnet according to one aspect is the R-T-B based permanent magnet in which R is a rare earth element including one or more selected from Nd and Pr and one or more selected from Dy and Tb, T is a combination of Fe and Co, and B is boron, wherein the R-T-B based permanent magnet further includes Zr, a total content of Nd, Pr, Dy, and Tb is 30.00 mass % to 32.20 mass %, Co content is 0.30 mass % to 1.30 mass %, Zr content is 0.21 mass % to 0.85 mass %, and B content is 0.90 mass % to 1.02 mass % with respect to 100 mass % of the R-T-B based permanent magnet.

The R-T-B based permanent magnet according to the present invention attains good magnetic properties and corrosion resistance even when Co content is low by having a composition within the above range.

The R-T-B based permanent magnet may further include Cu and Cu content may be 0.10 mass % to 0.55 mass %.

The R-T-B based permanent magnet may further include Mn and Mn content may be 0.02 mass % to 0.10 mass %.

The R-T-B based permanent magnet may further include Al and Al content may be 0.07 mass % to 0.35 mass %.

The R-T-B based permanent magnet may further include Ga and Ga content may be 0.02 mass % to 0.15 mass %.

A heavy rare earth element content may be 2.0 mass % or less.

A concentration gradient of the heavy rare earth element may decrease from a surface towards an inside of the magnet.

BRIEF DESCRIPTION OF THE DRAWINGS

FIGURE is a schematic diagram of an R-T-B based permanent magnet according to the present embodiment.

DETAILED DESCRIPTION

Hereinafter, the present invention is described based on the embodiment shown in the FIGURE.

<R-T-B Based Permanent Magnet>

An R-T-B based permanent magnet according to the present embodiment has main phase grains made of crystal grains having $R_2T_{14}B$ type crystal structure. Further, the R-T-B based permanent magnet has grain boundaries formed between two or more adjacent main phase grains.

A shape of the R-T-B based permanent magnet according to the present embodiment is not particularly limited.

By including plurality of specific elements in a specific range of content, the R-T-B based permanent magnet according to the present embodiment can improve a residual magnetic flux density Br, a coercive force HcJ, a squareness ratio Hk/HcJ, and a corrosion resistance.

The R-T-B based permanent magnet according to the present embodiment may have a concentration distribution of which a heavy rare earth element concentration decreases from outer side to inner side of the R-T-B based permanent magnet. A type of the heavy rare earth element is not particularly limited. For example, it may be Nd or Tb, or Tb. That is, the R-T-B based permanent magnet according to the present embodiment includes both a light rare earth element and a heavy rare earth element as R.

As shown in the FIGURE, the rectangular parallelepiped shape R-T-B based permanent magnet has a surface part and a center part. A content of a heavy rare earth element at the surface part can be higher by 2% or more, 5% or more, and 10% or more than a content of a heavy rare earth element at the center part. The surface part means the surface of the R-T-B based permanent magnet 1. For example, POINT C,C' shown in the FIGURE (C and C' each represents a center of gravity at each surface of opposing two surfaces shown in the FIGURE) is the surface part. The center part means the center of the R-T-B based permanent magnet 1. For example, the center part means a part which is half the thickness of the R-T-B based permanent magnet 1. For example, POINT M shown in the FIGURE (a middle point between POINT C and POINT C') is the center part. POINT C,C' may be the center of gravity of the surface having the largest area among the surfaces of the R-T-B based permanent magnet 1 and may be the center of gravity of the surface facing the largest surface.

In general, a rare earth element is classified into a light rare earth element and a heavy rare earth element. The light rare earth element of the R-T-B based permanent magnet according to the present embodiment is Sc, Y, La, Ce, Pr, Nd, Sm, and Eu; and the heavy rare earth element is Gd, Tb, Dy, Ho, Er, Tm, Yb, and Lu.

A method of forming a heavy rare earth element concentration distribution in the R-T-B based permanent magnet is not particularly limited. For example, due to the grain boundary diffusion of the heavy rare earth element which is described in below, the R-T-B based permanent magnet can have the concentration distribution of the heavy rare earth element.

The main phase grains of the R-T-B based permanent magnet according to the present embodiment may be core-shell grains having a core and a shell covering the core. Further, the heavy rare earth element may exist at least in the shell; Dy or Tb may exist in the shell; or Tb may exist in the shell.

By having the heavy rare earth element in the shell, the magnetic properties of the R-T-B based permanent magnet can be improved efficiently.

In the present embodiment, the shell is defined as a part where a ratio (heavy rare earth element/light rare earth element (molar ratio)) of the heavy rare earth element (for example, Dy, Tb, and the like) against the light rare earth element (for example, Nd, Pr, and the like) is two times or more of the ratio at the main phase grain center part (core).

A thickness of the shell is not particularly limited, and it may be 500 nm or less in average A particle size of the main phase grains may be 1.0 μm or more and 6.5 μm or less in average.

A method of forming the main phase grains to have the above-mentioned core-shell grains is not particularly limited. For example, a method using the grain boundary diffusion as described in below may be mentioned. As the heavy rare earth element diffuses to the grain boundaries and as the heavy rare earth element substitutes the rare earth element R at the surface of the main phase grains, the shell having a high ratio of the heavy rare earth element is formed, and the above-mentioned core-shell grains are formed.

R is a rare earth element including at least one selected from Nd and Pr and at least one selected from Dy and Tb. At least Nd and Tb may be included as R.

T is a combination of Fe and Co.

B is boron. Part of boron included in B site of the R-T-B based permanent magnet may be substituted by carbon (C).

A total content of Nd, Pr, Dy, and Tb in the R-T-B based permanent magnet (TRE) according to the present embodiment is 30.00 mass % or more and 32.20 mass % or less with respect to 100 mass % of the R-T-B based permanent magnet. In case TRE is too small, HcJ decreases. In case TRE is too large, Br decreases.

A total content of Nd and Pr in the R-T-B based permanent magnet according to the present embodiment is not particularly limited, and it may be 29.27 mass % or more and 31.27 mass % or less with respect to 100 mass % of the R-T-B based permanent magnet.

The R-T-B based permanent magnet of the present embodiment may at least include Nd and Pr as R. Pr content may be 0.0 mass % or more and 10.0 mass % or less. It may be 0.0 mass % or more and 7.6 mass % or less. In case Pr content is 10.0 mass % or less, HcJ has a small temperature coefficient. Particularly, from the point of increasing HcJ at high temperature, Pr content may be 0.0 mass % to 7.6 mass %.

In the R-T-B based permanent magnet of the present embodiment, Pr content may be 5.8 mass % or more, or it may be less than 5.8 mass %. In case Pr content is 5.8 mass % or more, HcJ improves. In case Pr content is less than 5.8 mass %, HcJ has a small temperature coefficient.

In case Pr content is 5.8 mass % or more, Pr content may be 5.8 mass % or more and 7.6 mass % or less. Pr/(Nd+Pr) may satisfy a mass ratio of 0.19 or more and 0.25 or less. In case Pr content and/or Pr/(Nd+Pr) are within the above-mentioned range, HcJ improves.

Pr may not be included intentionally. By not including Pr intentionally, a particularly excellent temperature coefficient of HcJ can be attained and HcJ at high temperature becomes higher. In case of not including Pr intentionally, less than 0.2 mass % of Pr may be included or 0.1 mass % or less of Pr may be included as an impurity.

The R-T-B based permanent magnet according to the present embodiment may include 2.0 mass % or less of the heavy rare earth element (for example, one or more selected from Dy and Tb) in total with respect to 100 mass % of the R-T-B based permanent magnet. As the heavy rare earth element, Tb may be substantially only included. When the content of the heavy rare earth element is 2.0 mass % or less in total, Br tends to be good. By reducing a content of expensive heavy rare earth element, the R-T-B based permanent magnet tends to be easily produced in a low cost.

Co content is 0.30 mass % or more and 1.3 mass % or less with respect to 100 mass % of the R-T-B based permanent magnet. It may be 0.30 mass % or more and 0.43 mass % or less. In the present embodiment, the R-T-B based permanent magnet having a high corrosion resistance can be obtained even when expensive Co is contained less. As a result, the R-T-B based permanent magnet having a high corrosion resistance tends to be easily produced in a low cost. When Co content is too small, the corrosion resistance decreases even when Zr content is within the below mentioned range. When Co content is too much, a corrosion resistance improving effect is leveled off and the cost increases.

Fe content is substantially a balance of the R-T-B based permanent magnet. By referring "substantially a balance", it means that it is a balance excluding the aforementioned R and Co, and below mentioned B, Zr, M, and other elements.

B content in the R-T-B based permanent magnet according to the present embodiment is 0.90 mass % or more and 1.02 mass % or less with respect to 100 mass % of the R-T-B based permanent magnet. It may be 0.92 mass % or more and 1.00 mass % or less. In case B content is too small, Hk/HcJ tends to easily decrease. In case B content is too large, HcJ tends to easily decrease.

The R-T-B based permanent magnet according to the present embodiment further includes Zr. Zr content is 0.21 mass % or more and 0.85 mass % or less with respect to 100 mass % of the R-T-B based permanent magnet. By having Zr within the above-mentioned range, an abnormal grain growth during sintering can be restricted and improves Hk/HcJ and a magnetization ratio under a low magnetic field. Even when Co content is within the above-mentioned range, a good corrosion resistance can be attained. When Zr content is too small, the abnormal grain growth tends to easily occur, and Hk/HcJ and the magnetization ratio under a low magnetic field are deteriorated. Further, the corrosion resistance decreases. When Zr content is too large, Br and Hk/HcJ tend to easily decrease.

Zr/Co ratio may be 0.31 or more and 1.98 or less. Further, it may be 0.48 or more and 1.40 or less, and 0.73 or more and 1.40 or less. By having Zr/Co ratio within the above-mentioned range, the R-T-B based permanent magnet having a high corrosion resistance can be obtained even when expensive Co is contained less. As a result, the R-T-B based permanent magnet having a high corrosion resistance tends to be easily produced in a low cost. In case Zr/Co ratio is too large, the corrosion resistance decreases even when Zr content is within the above-mentioned range. In case Zr/Co ratio is too small, the corrosion resistance improving effect is leveled off and the cost increases. Particularly, by having 0.48 or more and 1.40 or less of Zr/Co ratio, HcJ and Br tend to become larger.

In general, the grain boundaries of the R-T-B based permanent magnet include an R-rich phase having a higher mass concentration of R than in main phases. When the magnet is corroded by water vapor, hydrogen generated by the corrosion reaction is stored into the R-rich phase existing in the grain boundaries. Then, by storing hydrogen into the R-rich phase, R included in the R-rich phase tends to easily change into hydroxides. Since R included in the R-rich phase changes to hydroxides, a volume of the R-rich phase expands. The volume expansion of the R-rich phase causes the main phase grains to fall off. Then, it is thought that due to this falling of the main phase grains, the corrosion of the magnet progresses in an accelerated pace towards inside of the magnet.

In case Zr content of the R-T-B based permanent magnet is 0.21 mass % or more, R mass concentration in the R-rich phase tends to easily decrease and Fe mass concentration and Zr mass concentration in the R-rich phase tend to easily increase compared to the case having less than 0.21 mass % of Zr content in the R-T-B based permanent magnet. In case the R-T-B based permanent magnet includes Cu, Cu mass concentration in the R-rich phase tends to easily increase. In case Zr content of the R-T-B based permanent magnet is less than 0.21 mass %, R mass concentration in the R-rich phase tends to easily become 65 mass % or more. In case Zr content is 0.21 mass % or more, R mass concentration in the R-rich phase tends to easily become low, and for example it easily becomes 55 mass % or less.

In case of including the R-rich phase having relatively low R mass concentration and relatively high mass concentration of each of Fe, Zr, and Cu, it is difficult to store hydrogen compared to the case of including R-rich phase having 65 mass % or more of R mass concentration and relatively low mass concentration of each of Fe, Zr, and Cu. As a result, the R-T-B based permanent magnet having a high corrosion resistance can be obtained even when Co content is small.

Zr content may be 0.25 mass % or more and 0.65 mass % or less, and 0.31 mass % or more and 0.60 mass % or less. Particularly, by having 0.25 mass % or more of Zr content, an optimum temperature for sintering becomes wider. That is, an abnormal grain growth restricting effect is further enhanced during sintering. Further, the properties vary less, hence a production stability improves.

The R-T-B based permanent magnet according to the present embodiment may further include M. M is at least one selected from Cu, Mn, Al, and Ga. M content is not particularly limited. M may not be included. M content may be 0 mass % or more and 1.3 mass % or less with respect to 100 mass % of the R-T-B based permanent magnet.

Cu content is not particularly limited. Cu may not be included. Cu content may be 0.10 mass % or more and 0.55 mass % or less, 0.14 mass % or more and 0.53 mass % or less, and 0.20 mass % or more and 0.50 mass % or less with respect to 100 mass % of the R-T-B based permanent magnet. In case Cu content is too small, Br and HcJ tend to easily decrease. Further, the corrosion resistance tends to easily decrease. In case Cu content is too large, HcJ tends to easily decrease.

Mn content is not particularly limited. Mn may not be included. Mn content may be 0.02 mass % or more and 0.10 mass % or less, 0.02 mass % or more and 0.06 mass % or less, and 0.02 mass % or more and 0.04 mass % or less with respect to 100 mass % of the R-T-B based permanent magnet. In case Mn content is too small, Br and HcJ tend to easily decrease. In case Mn content is too large, HcJ tends to easily decrease.

Al content is not particularly limited. Al may not be included. Al content may be 0.07 mass % or more and 0.35 mass % or less, 0.10 mass % or more and 0.30 mass % or less, and 0.15 mass % or more and 0.23 mass % or less with respect to 100 mass % of the R-T-B based permanent magnet. In case Al content is too small, HcJ tends to easily decrease. Further, a difference of magnetic properties (particularly HcJ) due to changes in an aging temperature during production and a heat treatment temperature after the grain boundary diffusion which are described in below, becomes larger, and the production stability declines. In case Al content is too large, Br tends to easily decrease.

Ga content is not particularly limited. Ga may not be included. Ga content may be 0.02 mass % or more and 0.15 mass % or less, and 0.04 mass % or more and 0.15 mass % or less with respect to 100 mass % of the R-T-B based permanent magnet. In case Ga content is too small, HcJ tends to easily decrease. In case Ga content is too large, sub-phases such as an R-T-Ga phase and the like tends to be easily formed in the grain boundaries and Br tends to easily decrease.

The R-T-B based permanent magnet according to the present embodiment may include elements other than the above-mentioned Nd, Pr, Dy, Tb, T, B, C, Zr, and M as other elements. A content of other elements is not particularly limited, it may be an amount which does not significantly influence the magnetic properties and the corrosion resistance of the R-T-B based permanent magnet. For example, it may be 1.0 mass % or less in total with respect to 100 mass % of the R-T-B based permanent magnet. A content of rare earth elements other than Nd, Pr, Dy, and Tb may be 0.3 mass % or less in total.

Hereinafter, each content of carbon (C), nitrogen (N), and oxygen (O) are described as an example of other elements.

C content of the R-T-B based permanent magnet according to the present embodiment may be 0.15 mass % or less, 0.13 mass % or less, or 0.11 mass % or less with respect to 100 mass % of the R-T-B based permanent magnet. C content may be 0.06 mass % or more and 0.15 mass % or less, 0.06 mass % or more and 0.13 mass % or less, and 0.06 mass % or more and 0.11 mass % or less. By having 0.15 mass % or less of C content, HcJ tends to improve. Particularly from the point of improving HcJ, C content may be 0.11 mass % or less. A production of an R-T-B based permanent magnet having less than 0.06 mass % of C content makes process conditions of the R-T-B based permanent magnet more difficult. Therefore, it is difficult to produce the R-T-B based permanent magnet having less than 0.06 mass % of C content in a low cost. Particularly from the point of improving Hk/HcJ, C content may be 0.10 mass % or more and 0.15 mass % or less.

N content of the R-T-B based permanent magnet according to the present embodiment may be 0.12 mass % or less, 0.11 mass % or less, or 0.105 mass % or less with respect to 100 mass % of the R-T-B based permanent magnet. It may be 0.025 mass % or more and 0.12 mass % or less, 0.025 mass % or more and 0.11 mass % or less, and 0.025 mass % or more and 0.105 mass % or less. As N content decreases, HcJ tends to easily improve. A production of an R-T-B based permanent magnet having less than 0.025 mass % of N content makes process conditions of the R-T-B based permanent magnet more difficult. Therefore, it is difficult to produce the R-T-B based permanent magnet having less than 0.025 mass % of N content in a low cost.

O content of the R-T-B based permanent magnet according to the present embodiment may be 0.10 mass % or less, 0.08 mass % or less, 0.07 mass % or less, and 0.05 mass % or less with respect to 100 mass % of the R-T-B based permanent magnet. It may be 0.035 mass % or more and 0.05 mass % or less. Further, a production of an R-T-B based permanent magnet having less than 0.035 mass % of O content makes process conditions of the R-T-B based permanent magnet more difficult. Therefore, it is difficult to produce the R-T-B based permanent magnet having less than 0.035 mass % of O content in a low cost.

As a method of measuring various components included in the R-T-B based permanent magnet according to the present embodiment, conventionally and generally known methods can be used. Amounts of various elements can be measured for example by X-ray fluorescence analysis, an inductively coupled plasma atomic emission spectroscopy (ICP analysis), and the like. O content is measured for example by an inert gas fusion-nondispersive infrared absorption method. C content is measured for example by a combustion in oxygen stream-infrared absorption method. N content is measured for example by an inert gas fusion-thermal conductivity method.

A shape of the R-T-B based permanent magnet according to the present embodiment is not particularly limited. For example, a rectangular parallelepiped shape and the like may be mentioned.

Hereinafter, a manufacturing method of the R-T-B based permanent magnet will be described in detail, however, it is not limited thereto and other known methods can be used.

[Preparation Step of Raw Material Powder]

A raw material powder can be prepared by a known method. A single alloy method using a single alloy will be described in the present embodiment, however, a so-called two alloy method may be used to prepare the raw material powder in which first and second alloys each having different composition are mixed.

First, a raw material alloy of the R-T-B based permanent magnet is prepared (an alloy preparation step). In the alloy preparation step, raw material metals corresponding to the composition of the R-T-B based permanent magnet of the present embodiment are melted by a known method, and then casting is carried out, thereby the raw material alloy having desired composition is prepared.

Examples of raw material metals include metals such as a simple rare earth element; a simple metal element such as Fe, Co, Cu, and the like; alloys made of plurality of types of metals (for example, Fe—Co alloy); or compounds made of plurality of types of elements (for example, ferroboron); and the like can be used. A casting method of forming a raw material alloy from the raw material metals is not particularly limited. In order to obtain the R-T-B based permanent magnet having high magnetic properties, a strip casting method may be used. A homogenization treatment may be performed to the obtained raw material alloy by a known method as necessary.

After preparing the raw material alloy, it is pulverized (a pulverization step). An atmosphere of each step from the pulverization step to the sintering step can be a low oxygen concentration atmosphere to obtain higher magnetic properties. For instance, the oxygen concentration in the atmosphere of each step may be 200 ppm or less. By controlling the oxygen concentration in each step, O content of the R-T-B based permanent magnet can be controlled.

Below describes a two-step process as a pulverization that includes a coarse pulverization step of pulverizing the alloy to a particle diameter of about several hundred μm to several mm, and a fine pulverization step of finely pulverizing the alloy to a particle diameter of about several μm. However, a single-step process consisting solely of a fine pulverization step may be carried out.

In the coarse pulverization step, the raw material alloy is coarsely pulverized till the particle size becomes approximately several hundred μm to several mm. Thereby, a coarsely pulverized powder is obtained. A method of coarse pulverization is not particularly limited, and it can be known methods such as a hydrogen storage pulverization method, a method using a coarse pulverizer, and the like. In case of performing the hydrogen storage pulverization, N content of the R-T-B based permanent magnet can be controlled by controlling a nitrogen gas concentration in an atmosphere during the dehydrogenation treatment.

Next, the obtained coarsely pulverized powder is finely pulverized till the average particle size becomes approximately several μm (a fine pulverization step). Thereby, a finely pulverized powder (raw material powder) is obtained. The average particle size of the finely pulverized powder may be 1 μm or more and 10 μm or less, 2 μm or more and 6 μm or less, or 2 μm or more and 4 μm or less. N content of the R-T-B based permanent magnet can be controlled by controlling a nitrogen gas concentration in the atmosphere during the fine pulverization step.

A method of fine pulverization is not particularly limited. For example, various kinds of fine pulverizers can be used for the fine pulverization.

When the coarsely pulverized powder is finely pulverized, by adding various pulverization aids such as lauramide, oleyamide, and the like, the finely pulverized powder having crystal particles which tends to easily orient to specific direction can be obtained when the finely pulverized powder is pressurized and compacted in the magnetic field. In addition, C content of the R-T-B based permanent magnet can be controlled by varying an amount of the pulverization aid added.

[Compacting Step]

In a compacting step, the above-mentioned finely pulverized powder is compacted to a desired shape. A compacting method is not particularly limited. According to the present embodiment, the above-mentioned finely pulverized powder is filled in a die and pressurized in a magnetic field. A green compact obtained as such has crystal particles oriented in a specific direction, hence the R-T-B based permanent magnet with even higher Br can be obtained.

Pressure of 20 MPa or more and 300 MPa or less can be applied during compacting. Magnetic field of 950 kA/m or more can be applied, and 950 kA/m or more and 1600 kA/m or less can be applied. The applied magnetic field is not limited to a static magnetic field, and it can be a pulse magnetic field. Also, the static magnetic field and the pulse magnetic field can be used together.

As a compacting method, other than dry compacting in which the finely pulverized powder is directly compacted as described in above, wet compacting can be applied in which a slurry obtained by dispersing the finely pulverized powder in a solvent such as oil is compacted.

A shape of the green compact obtained by compacting the finely pulverized powder is not particularly limited. Density of the green compact at this point can be 4.0 Mg/m$^3$ to 4.3 Mg/m$^3$.

[Sintering Step]

A sintering step is a process in which the green compact is sintered in a vacuumed or inert gas atmosphere to obtain a sintered body. A sintering condition needs to be adjusted depending on conditions such as a composition, a pulverization method, a difference of particle size and particle size distribution and the like. For example, sintering is carried out by heating the green compact in a vacuumed or inert gas atmosphere at 1000° C. or higher and 1200° C. or lower for one hour or more to 20 hours or less. By sintering under the above-mentioned sintering conditions, the sintered body with high density can be obtained. In the present embodiment, the sintered body having density of 7.45 Mg/m$^3$ or more is obtained. The density of the sintered body can be 7.50 Mg/m$^3$ or more.

[Aging Treatment Step]

An aging treatment step is a step in which the sintered body is heat treated at lower temperature than the sintering temperature (aging treatment). There is no particular limitation as whether to carry out the aging treatment step, and the number of times of carrying out the aging treatment step is also not particularly limited. The aging treatment step is performed accordingly depending on the desired magnetic properties. A grain boundary diffusion step which is described in below may be used as the aging treatment step. Hereinafter, the embodiment carrying out the two-step aging treatment is described.

A first-time aging step is referred to as a first aging step, a second-time aging step is referred to as a second aging step. The aging temperature of the first aging step is referred to as T1, and the aging temperature of the second aging step is referred to as T2.

T1 and the aging time during the first aging step are not particularly limited. T1 may be 700° C. or higher and 900° C. or lower. The aging time can be one hour or more and 10 hours or less.

T2 and the aging time during the second aging step are not particularly limited. T2 may be 450° C. or higher and 700° C. or lower. The aging time can be one hour or more and 10 hours or less.

By such aging treatments, the magnetic properties especially HcJ of the R-T-B based permanent magnet obtained at the end can be improved.

[Machining Step (Before Grain Boundary Diffusion)]

A step for machining the sintered body according to the present embodiment in order to attain a desired shape may be employed if necessary. As examples of the machining method, a shape machining such as cutting and grinding, a chamfering such as barrel polishing, and the like may be mentioned.

[Grain Boundary Diffusion Step]

A grain boundary diffusion step can be performed by adhering a diffusing material to the surface of a sintered body and heating the the sintered body adhered with the diffusing material. Thereby, the R-T-B based permanent magnet can be obtained. In the present embodiment, a type of the diffusing material is not particularly limited. The diffusing material may include the heavy rare earth element (for example, Tb and/or Dy), and the diffusing material may include all of the below mentioned first to third components. The first component is a hydride of Tb and/or a hydride of Dy. The second component is a hydride of Nd and/or a hydride of Pr. The third component is Cu, an alloy including Cu, and/or a compound including Cu.

During the grain boundary diffusion step, grain boundary phases having a high rare earth element R concentration which exist in the grain boundaries of a pre-diffusion magnet (sintered body) becomes liquid phases along with the temperature increase. As the diffusing material dissolves into the liquid phases, components of the diffusing material diffuse from the surface of the pre-diffusion magnet towards inside of the pre-diffusion magnet. In case hydrides of a heavy rare earth element RH is used as the diffusing material, the RH hydrides adhered on the surface of the pre-diffusion magnet tend to rapidly and easily dissolve to the liquid phases which has oozed out to the surface of the pre-diffusion magnet when dehydrogenation reaction takes place due to the temperature increase. As a result, the concentration of RH tends to increase easily near the surface of the pre-diffusion magnet, and RH diffusion tends to easily occur towards inside of the main phase grain positioned near the surface of the pre-diffusion magnet. As a result, RH tends to easily remain at the inside of the main phase grain positioned near the surface of the pre-diffusion magnet. Hence it is difficult to diffuse to the inside of the pre-diffusion magnet. Thus, there are lesser RH to diffuse towards inside of the pre-diffusion magnet, and it becomes difficult to improve the coercive force of the R-T-B based permanent magnet.

In case the diffusing material includes a first component (heavy rare earth element RH), a second component (light rare earth element RL), and a third component (Cu), since Cu and R have low eutectic point, Cu included in the diffusing material tends to first diffuse easily to the liquid phases when liquid phases having high R concentration formed in the pre-diffusion magnet oozes out near the diffusing material at the surface. Therefore, Cu first dissolves to the liquid phases, then Cu concentration in the liquid phases near the surface of the pre-diffusion magnet increases. As a result, an R—Cu rich phase is formed near the surface of the pre-diffusion magnet, then Cu diffuses to the liquid phases at the inside of the pre-diffusion magnet. Regarding RL as the second component and RH as the first component, RL and RH dissolve to the R—Cu rich liquid phase after the dehydrogenation reaction of the hydrides. Eutectic point of RL as the second component and Cu are around 500° C., and eutectic point of RH as the first component is 700 to 800° C. or so. Therefore, following the diffusion of Cu, RL as the second component dissolves to the R—Cu rich liquid phase near the surface of the pre-diffusion magnet, then RH as the first component dissolves. Since RL as the second component dissolves after Cu, the diffusion of Cu into the pre-diffusion magnet is promoted, and the R—Cu rich liquid phase is formed in the grain boundaries of the pre-diffusion magnet.

Among the first component (RH), the second component (RL), and the third component (Cu), the first component (RH) tends to dissolved in the liquid phases lastly. Therefore, RH derived from the first component diffuses to the liquid phases in the pre-diffusion magnet after Cu and RL. Thus, compared to the case without Cu and RL, a rapid increase of RH concentration near the surface of the pre-diffusion magnet is suppressed. Hence, this can restrict the diffusion of RH towards the inside of the main phase grain positioned near the surface of the pre-diffusion magnet. As a result, more RH is diffused in the pre-diffusion magnet, hence the coercive force of the permanent magnet tends to improve.

The diffusing material may be a slurry including a solvent in addition to the above-mentioned first to third components. The solvent included in the slurry may be any solvent other than water. For example, it may be organic solvents such as alcohols, aldehydes, ketones, and the like. The diffusing material may include a binder. A type of the binder is not particularly limited. For example, resins such as acrylic resins and the like may be included as the binder. By including the binder, the diffusing material becomes easier to adhere to the surface of the sintered body.

The diffusing material may be a paste including the solvent and the binder in addition to the above mentioned first to third components. The paste has a fluidity and a high viscosity. The viscosity of the paste is higher than the viscosity of the slurry.

The solvent may be removed before the grain boundary diffusion by drying the sintered body adhered with the slurry or the paste.

The diffusion treatment temperature during the grain boundary diffusion step according to the present embodiment may be equal to or higher than the eutectic point of RL and Cu and lower than the sintering temperature. For example, the diffusion treatment temperature may be 800° C. or higher and 950° C. or lower. During the grain boundary diffusion step, the temperature of the pre-diffusion magnet may be increased gradually from the temperature lower than the diffusion treatment temperature until the temperature reaches to the diffusion treatment temperature.

The length of time that the temperature of the pre-diffusion magnet is maintained at the diffusion treatment temperature (the diffusion treatment time) is for example 1 hour or longer and 50 hours or shorter. The atmosphere during the diffusion treatment may be non-oxidizing atmosphere. The non-oxidizing atmosphere may be for example a rare gas such as Ar and the like. Pressure of the atmosphere during the diffusion treatment step may be 1 kPa or less. Due to such reduced-pressure atmosphere, the dehydrogenation reaction of the hydrides is facilitated, and the diffusion material tends to easily dissolve into the liquid phases.

After the diffusion treatment, a heat treatment may be further performed. A heat treatment temperature in such case may be 450° C. or higher and 600° C. or lower. A heat treatment time may be 1 hour or longer and 10 hours or shorter. By carrying out such heat treatment, the magnetic properties, especially, HcJ of the R-T-B based permanent magnet obtained at the end can be improved.

The production stability of the R-T-B based permanent magnet according to the present embodiment can be confirmed by the difference of the magnetic properties. The difference of the magnetic properties is caused for example by the change of the diffusion treatment temperature during the grain boundary diffusion step and/or the change of the heat treatment temperature after the heavy rare earth element diffusion.

[Machining Step (After Grain Boundary Diffusion)]

After the grain boundary diffusion step, polishing may be carried out in order to remove the diffusing material remaining on the surface of the R-T-B based permanent magnet. Also, the R-T-B based permanent magnet may be subjected to other machining. For example, shape machining such as cutting and grinding, surface machining such as chamfering and barrel polishing, and the like may be carried out.

In the present embodiment, the machining steps are carried out before and after the grain boundary diffusion, however, these steps do not necessarily have to be performed. Also, the grain boundary diffusion step may be used as the aging treatment step. A heating temperature is not particularly limited in case the grain boundary diffusion step is used as the aging treatment step. It is particularly preferably performed at a preferable temperature for the grain boundary diffusion step and also at a preferable temperature for the aging treatment step.

A heavy rare earth element concentration of the R-T-B based permanent magnet after the grain boundary diffusion tends to have a concentration distribution which decreases from outer side towards inner side of the R-T-B based permanent magnet. The main phase grains included in the R-T-B based permanent magnet after the grain boundary diffusion tends to easily have the above-mentioned core-shell structure.

The R-T-B based permanent magnet according to the present embodiment obtained as such attains desired properties. Specifically, high Br, HcJ, and Hk/HcJ are attained; and excellent corrosion resistance and production stability are attained. Further, a good temperature property is attained, and HcJ at high temperature is high and a decrease of HcJ with respect to the temperature increase is small.

The R-T-B based permanent magnet according to the present embodiment obtained by the above-mentioned method becomes a magnetic R-T-B based permanent magnet by magnetizing it.

The R-T-B based permanent magnet according to the present embodiment is suitably used for a motor, an electric generator, and the like.

The present invention is not to be limited to the above described embodiment and can be variously modified within the scope of the present invention.

The method for producing the R-T-B based permanent magnet is not limited to the above method, and may be suitably changed. For example, while the above-mentioned method for obtaining the R-T-B based permanent magnet is a method by sintering, the R-T-B based permanent magnet according to the present embodiment may be produced by hot working. A method for producing the R-T-B based permanent magnet by hot working includes the following steps:

(a) a melting and quenching step of melting raw material metals and quenching the resulting molten metal to obtain a ribbon;

(b) a pulverization step of pulverizing the ribbon to obtain a flake-like raw material powder;

(c) a cold forming step of cold-forming the pulverized raw material powder;

(d) a preheating step of preheating the cold-formed body;

(e) a hot forming step of hot-forming the preheated cold-formed body;

(f) a hot plastic deforming step of plastically deforming the hot-formed body into a predetermined shape; and (g) an aging treatment step of aging the R-T-B based permanent magnet. Note that, steps after the aging treatment step are the same as the case of producing by sintering.

EXAMPLES

Hereinafter, the present invention is described based on further detailed examples, however, the present invention is not to be limited thereto.

(Production of R-T-B Based Permanent Magnet)

A raw material alloy was produced by a strip casting method so that a composition of the R-T-B based permanent magnet obtained at the end satisfied each composition of samples shown in Tables 1 to 3 described in below. Experiments shown in Tables 1 and 2 all had Pr content of 0 mass %. In some cases, O, N, C, H, Si, Ca, La, Ce, Cr, and the like may be detected as other elements not indicated in Tables 1 to 3. Si was mixed mainly from ferroboron raw material and a crucible while melting an alloy. Ca, La, and Ce were mixed from a rare earth element raw material. Also, Cr may be mixed from electrolytic iron. Fe content in Tables 1 to 3 is indicated as "bal." since Fe content was a balance when the entire R-T-B based permanent magnet including the above-mentioned other elements was 100 mass %.

Subsequently, hydrogen was stored into the raw material alloy by flowing hydrogen gas at room temperature for one hour. Then, the atmosphere was changed to Ar gas and a dehydrogenation treatment was performed at 600° C. for one hour to perform a hydrogen storage pulverization to the raw material alloy.

Next, to the raw material alloy powder, a mass ratio of 0.1% oleic amide was added as a pulverization aid and mixed using a Nauta mixer.

Subsequently, the obtained powder was finely pulverized in a nitrogen gas stream using an impact plate type jet mill apparatus and the fine powder (raw material powder) having an average particle size of 3.0 μm or so was obtained. The average particle size was an average particle size D50 measured by a laser diffraction type particle size analyzer.

The obtained fine powder was compacted in the magnetic field and a green compact was manufactured. Here, the magnetic field applied to the obtained fine powder during compacting was a static magnetic field of 1200 kA/m. The pressure applied during compacting was 120 MPa. The direction of magnetic field application and the direction of pressurization were perpendicular to each other.

Subsequently, the green compact was sintered and a sintered body was obtained. Optimum conditions of sintering vary depending on the composition and the like; however, sintering was carried out within the temperature range of 1030° C. to 1070° C. for four hours. Sintering was carried out in a vacuumed atmosphere. The sintered density at this point was within the range of 7.51 Mg/m³ to 7.55 Mg/m³. Then, in Ar atmosphere under atmospheric pressure, the first aging treatment was performed at the first aging temperature T1=850° C. for one hour and the second aging treatment was further performed at the second aging temperature T2=520° C. to 540° C. for one hour. Accordingly, the sintered body of each sample shown in Tables 1 and 2 was obtained.

(Production of Diffusing Material Paste)

Next, the diffusing material paste used for the grain boundary diffusion was produced.

First, a metal Tb having a purity of 99.9% was subjected to a hydrogen storage by flowing hydrogen gas at room temperature. Then, the atmosphere was changed to Ar gas to perform a dehydrogenation treatment at 600° C. for 1 hour and a hydrogen storage pulverization of the metal Tb was performed. Next, as a pulverization aid, 0.05 mass % of zinc stearate was added with respect to 100 mass % of the metal Tb and then mixed using a Nauta mixer. Then, a fine pulverization was carried out using a jet mill in the atmosphere including 3000 ppm of oxygen, thereby a finely pulverized powder of Tb hydride having an average particle size of 10.0 μm or so was obtained.

Next, a finely pulverized powder of Nd hydride having an average particle size of 10.0 μm or so was obtained from a metal Nd having a purity of 99.9%. A method of obtaining the finely pulverized powder of Nd hydride is same as the method of obtaining the finely pulverized powder of Tb hydride.

46.8 parts by mass of the finely pulverized powder of Tb hydride, 17.0 parts by mass of the finely pulverized powder of Nd hydride, 11.2 parts by mass of a metal Cu powder, 23 parts by mass of alcohol, and 2 parts by mass of acrylic resin were kneaded to produce the diffusing material paste. The alcohol was a solvent and the acrylic resin was a binder.

(Coating and Heating Treatment of Diffusing Material Paste)

The above-mentioned sintered body was ground to a size of vertical length 11 mm×horizontal length 11 mm×thickness 4.2 mm (the direction of easy magnetization axis was 4.2 mm). Then, it was immersed for 3 minutes in a mixed solution of nitric acid and ethanol in a ratio of 3 mass % of nitric acid with respect to 100 mass % of ethanol, and then immersed in ethanol for 1 minute. Thereby an etching treatment was performed. The etching treatment of immersing in the mixed solution for 3 minutes and then immersing in ethanol for 1 minute was performed twice.

Next, the entire surface of the sintered body after the etching treatment was coated with the above-mentioned diffusing material paste. The diffusing material paste was coated in an amount so that Tb mass (Tb coating amount) with respect to 100 mass % of the sintered body satisfied a mass ratio shown in Tables 1 to 3.

Next, the sintered body coated with the diffusing material paste was left in an oven at 160° C. to remove the solvent in the diffusing material paste. Then, while flowing Ar under atmospheric pressure (1 atm) it was heated for 18 hours at 930° C. Further, while flowing Ar under atmospheric pressure the sintered body was heated for 4 hours at 520 to 540° C. Thereby, the R-T-B based permanent magnet of each sample shown in Tables 1 to 3 was obtained.

The surface of the R-T-B based permanent magnet was ground by 0.1 mm per each surface, then the composition, the magnetic properties, and the corrosion resistance were evaluated.

The R-T-B based permanent magnet was ground to a size of vertical length 11 mm×horizontal length 11 mm×thickness 4.2 mm (the direction of easy magnetization axis was 4.2 mm) by a vertical grinding machine, and the magnetic properties at room temperature were evaluated by a BH tracer. The R-T-B based permanent magnet was magnetized before measuring the magnetic properties by a pulse magnetic field of 4000 kA/m. Since the R-T-B based permanent magnet was thin, three magnets were stacked and the magnetic properties were evaluated. Note that, in the present examples, Hk/HcJ was calculated by Hk/HcJ×100(%) in which Hk (kA/m) is the magnetic field when a magnetization reaches 90% of Br in the second quadrant (J-H demagnetization curve) of a magnetization J—magnetic field H curve. HcJ was measured when it was heated at 147° C. Further, the difference between HcJ at room temperature and HcJ at 147° C. was calculated and an absolute value thereof was divided by HcJ at room temperature, thereby a demagnetization factor was obtained.

In the present examples, when Br of the R-T-B based permanent magnet was 1400 mT or more, it was considered good. HcJ of the R-T-B based permanent magnet at room temperature was considered good when it was 1950 kA/m or more. HcJ of the R-T-B based permanent magnet at 147° C. was considered good when it was 900 kA/m or more. Hk/HcJ of the R-T-B based permanent magnet was considered good when it was 96.0% or more.

When Br, HcJ at room temperature, HcJ at 147° C., and Hk/HcJ of the R-T-B based permanent magnet were all good, then the magnetic properties of the R-T-B based permanent magnet were considered good. When at least one of Br, HcJ at room temperature, HcJ at 147° C., and Hk/HcJ were not good, then the magnetic properties were considered bad. Results are shown in Tables 1 to 3.

In addition, the corrosion resistance of the R-T-B based permanent magnet was tested. The corrosion resistance was tested by PCT test (Pressure Cooker Test) under saturated vapor pressure. Specifically, a mass change of the R-T-B based permanent magnet before and after the test under pressure of 2 atm for 1000 hours in 100% RH atmosphere was measured. The corrosion resistance was considered good when a mass decrease per a total surface area of the R-T-B based permanent magnet was 3 mg/cm² or less. The corrosion resistance was considered bad when a mass decrease per a total surface area of the R-T-B based permanent magnet was more than 3 mg/cm².

TABLE 1

| | Nd (mass %) | Dy (mass %) | Tb (mass %) | TRE (mass %) | B (mass %) | Al (mass %) | Ga (mass %) | Cu (mass %) | Mn (mass %) | Zr (mass %) | Co (mass %) |
|---|---|---|---|---|---|---|---|---|---|---|---|
| Example 1 | 30.27 | 0.00 | 0.78 | 31.05 | 0.96 | 0.23 | 0.02 | 0.27 | 0.04 | 0.40 | 0.43 |
| Example 2 | 30.27 | 0.00 | 0.78 | 31.05 | 0.96 | 0.23 | 0.04 | 0.27 | 0.04 | 0.40 | 0.43 |
| Example 3 | 30.27 | 0.00 | 0.78 | 31.05 | 0.96 | 0.23 | 0.08 | 0.27 | 0.04 | 0.40 | 0.43 |
| Example 4 | 30.27 | 0.00 | 0.79 | 31.06 | 0.96 | 0.23 | 0.15 | 0.27 | 0.04 | 0.40 | 0.43 |

TABLE 1-continued

| | | | | | | | | | | |
|---|---|---|---|---|---|---|---|---|---|---|
| Example 5 | 30.27 | 0.00 | 0.77 | 31.04 | 0.92 | 0.23 | 0.08 | 0.27 | 0.04 | 0.40 | 0.43 |
| Example 3 | 30.27 | 0.00 | 0.78 | 31.05 | 0.96 | 0.23 | 0.08 | 0.27 | 0.04 | 0.40 | 0.43 |
| Example 6 | 30.27 | 0.00 | 0.76 | 31.03 | 1.00 | 0.23 | 0.08 | 0.27 | 0.04 | 0.40 | 0.43 |
| Example 7 | 30.27 | 0.00 | 0.77 | 31.04 | 0.95 | 0.23 | 0.08 | 0.24 | 0.04 | 0.40 | 0.43 |
| Example 3 | 30.27 | 0.00 | 0.78 | 31.05 | 0.95 | 0.23 | 0.08 | 0.27 | 0.04 | 0.40 | 0.43 |
| Example 8 | 30.27 | 0.00 | 0.78 | 31.05 | 0.95 | 0.23 | 0.08 | 0.33 | 0.04 | 0.40 | 0.43 |
| Example 9 | 30.27 | 0.00 | 0.78 | 31.05 | 0.95 | 0.23 | 0.08 | 0.38 | 0.04 | 0.40 | 0.43 |
| Example 10 | 30.27 | 0.00 | 0.77 | 31.04 | 0.95 | 0.23 | 0.08 | 0.43 | 0.04 | 0.40 | 0.43 |
| Example 11 | 30.27 | 0.00 | 0.76 | 31.03 | 0.95 | 0.23 | 0.08 | 0.53 | 0.04 | 0.40 | 0.43 |
| Example 12 | 30.27 | 0.00 | 0.77 | 31.04 | 0.95 | 0.07 | 0.08 | 0.27 | 0.04 | 0.40 | 0.43 |
| Example 13 | 30.27 | 0.00 | 0.77 | 31.04 | 0.95 | 0.15 | 0.08 | 0.27 | 0.04 | 0.40 | 0.43 |
| Example 3 | 30.27 | 0.00 | 0.78 | 31.05 | 0.95 | 0.23 | 0.08 | 0.27 | 0.04 | 0.40 | 0.43 |
| Example 14 | 30.27 | 0.00 | 0.79 | 31.06 | 0.95 | 0.35 | 0.08 | 0.27 | 0.04 | 0.40 | 0.43 |
| Comparative example 1 | 30.27 | 0.00 | 0.78 | 31.05 | 0.95 | 0.23 | 0.08 | 0.27 | 0.04 | 0.40 | 0.21 |
| Example 15 | 30.27 | 0.00 | 0.78 | 31.05 | 0.95 | 0.23 | 0.08 | 0.27 | 0.04 | 0.40 | 0.30 |
| Example 3 | 30.27 | 0.00 | 0.78 | 31.05 | 0.95 | 0.23 | 0.08 | 0.27 | 0.04 | 0.40 | 0.43 |
| Example 16 | 30.27 | 0.00 | 0.78 | 31.05 | 0.95 | 0.23 | 0.08 | 0.27 | 0.04 | 0.40 | 0.84 |
| Example 17 | 30.27 | 0.00 | 0.78 | 31.05 | 0.95 | 0.23 | 0.08 | 0.27 | 0.04 | 0.40 | 1.28 |
| Example 18 | 30.27 | 0.00 | 0.77 | 31.04 | 0.95 | 0.23 | 0.08 | 0.27 | 0.02 | 0.40 | 0.43 |
| Example 3 | 30.27 | 0.00 | 0.78 | 31.05 | 0.95 | 0.23 | 0.08 | 0.27 | 0.04 | 0.40 | 0.43 |
| Example 19 | 30.27 | 0.00 | 0.77 | 31.04 | 0.95 | 0.23 | 0.08 | 0.27 | 0.10 | 0.40 | 0.43 |
| Comparative example 2 | 30.27 | 0.00 | 0.76 | 31.03 | 0.95 | 0.23 | 0.08 | 0.27 | 0.04 | 0.15 | 0.43 |
| Example 20 | 30.27 | 0.00 | 0.77 | 31.04 | 0.95 | 0.23 | 0.08 | 0.27 | 0.04 | 0.21 | 0.43 |
| Example 21 | 30.27 | 0.00 | 0.78 | 31.05 | 0.95 | 0.23 | 0.08 | 0.27 | 0.04 | 0.31 | 0.43 |
| Example 3 | 30.27 | 0.00 | 0.78 | 31.05 | 0.95 | 0.23 | 0.08 | 0.27 | 0.04 | 0.40 | 0.43 |
| Example 22 | 30.27 | 0.00 | 0.78 | 31.05 | 0.96 | 0.23 | 0.08 | 0.27 | 0.04 | 0.60 | 0.43 |
| Example 23 | 30.27 | 0.00 | 0.77 | 31.04 | 0.95 | 0.23 | 0.08 | 0.27 | 0.04 | 0.85 | 0.43 |
| Comparative example 3 | 30.27 | 0.00 | 0.76 | 31.03 | 0.95 | 0.23 | 0.08 | 0.27 | 0.04 | 1.00 | 0.43 |
| Example 24 | 29.27 | 0.00 | 0.77 | 30.04 | 0.95 | 0.23 | 0.08 | 0.27 | 0.04 | 0.40 | 0.43 |
| Example 25 | 29.77 | 0.00 | 0.77 | 30.54 | 0.95 | 0.23 | 0.08 | 0.27 | 0.04 | 0.40 | 0.43 |
| Example 3 | 30.27 | 0.00 | 0.78 | 31.05 | 0.95 | 0.23 | 0.08 | 0.27 | 0.04 | 0.40 | 0.43 |
| Example 26 | 30.77 | 0.00 | 0.78 | 31.55 | 0.95 | 0.23 | 0.08 | 0.27 | 0.04 | 0.40 | 0.43 |
| Example 27 | 31.27 | 0.00 | 0.77 | 32.04 | 0.95 | 0.23 | 0.08 | 0.27 | 0.04 | 0.40 | 0.43 |
| Comparative example 4 | 31.76 | 0.00 | 0.76 | 32.52 | 0.95 | 0.23 | 0.08 | 0.27 | 0.04 | 0.40 | 0.43 |
| Example 3 | 30.27 | 0.00 | 0.78 | 31.05 | 0.95 | 0.23 | 0.08 | 0.27 | 0.04 | 0.40 | 0.43 |
| Example 28 | 29.27 | 0.96 | 0.77 | 31.00 | 0.95 | 0.23 | 0.08 | 0.27 | 0.04 | 0.40 | 0.43 |

| | Fe (mass %) | Zr/Co | Tb coating amount (mass %) | Br at room temp (mT) | HcJ at room temp (kA/m) | HcJ at 147° C. (kA/m) | Demagnetization factor (%) | Hk/HcJ at room temp (%) | Magnetic properties | Corrosion resistance |
|---|---|---|---|---|---|---|---|---|---|---|
| Example 1 | bal. | 0.93 | 1.0 | 1423 | 1988 | 918 | 53.8 | 96.6 | Good | Good |
| Example 2 | bal. | 0.93 | 1.0 | 1426 | 2020 | 943 | 53.3 | 97.0 | Good | Good |
| Example 3 | bal. | 0.93 | 1.0 | 1424 | 2059 | 974 | 52.7 | 97.2 | Good | Good |
| Example 4 | bal. | 0.93 | 1.0 | 1421 | 2057 | 972 | 52.7 | 97.5 | Good | Good |
| Example 5 | bal. | 0.93 | 1.0 | 1422 | 2052 | 968 | 52.8 | 96.8 | Good | Good |
| Example 3 | bal. | 0.93 | 1.0 | 1424 | 2059 | 974 | 52.7 | 97.2 | Good | Good |
| Example 6 | bal. | 0.93 | 1.0 | 1416 | 2009 | 934 | 53.5 | 97.6 | Good | Good |
| Example 7 | bal. | 0.93 | 1.0 | 1416 | 2015 | 939 | 53.4 | 96.6 | Good | Good |
| Example 3 | bal. | 0.93 | 1.0 | 1424 | 2059 | 974 | 52.7 | 97.2 | Good | Good |
| Example 8 | bal. | 0.93 | 1.0 | 1423 | 2057 | 972 | 52.7 | 97.3 | Good | Good |
| Example 9 | bal. | 0.93 | 1.0 | 1421 | 2047 | 964 | 52.9 | 97.3 | Good | Good |
| Example 10 | bal. | 0.93 | 1.0 | 1418 | 2036 | 955 | 53.1 | 97.2 | Good | Good |
| Example 11 | bal. | 0.93 | 1.0 | 1416 | 2008 | 933 | 53.5 | 96.9 | Good | Good |
| Example 12 | bal. | 0.93 | 1.0 | 1447 | 1988 | 918 | 53.8 | 97.2 | Good | Good |
| Example 13 | bal. | 0.93 | 1.0 | 1439 | 2022 | 944 | 53.3 | 97.2 | Good | Good |
| Example 3 | bal. | 0.93 | 1.0 | 1424 | 2059 | 974 | 52.7 | 97.2 | Good | Good |
| Example 14 | bal. | 0.93 | 1.0 | 1403 | 2078 | 989 | 52.4 | 97.0 | Good | Good |
| Comparative example 1 | bal. | 1.90 | 1.0 | 1420 | 2048 | 965 | 52.9 | 97.1 | Good | Bad |
| Example 15 | bal. | 1.33 | 1.0 | 1421 | 2057 | 972 | 52.7 | 97.2 | Good | Good |
| Example 3 | bal. | 0.93 | 1.0 | 1424 | 2059 | 974 | 52.7 | 97.2 | Good | Good |
| Example 16 | bal. | 0.48 | 1.0 | 1427 | 2047 | 964 | 52.9 | 97.1 | Good | Good |
| Example 17 | bal. | 0.31 | 1.0 | 1428 | 2042 | 960 | 53.0 | 97.0 | Good | Good |
| Example 18 | bal. | 0.93 | 1.0 | 1414 | 2048 | 965 | 52.9 | 97.7 | Good | Good |
| Example 3 | bal. | 0.93 | 1.0 | 1424 | 2059 | 974 | 52.7 | 97.2 | Good | Good |
| Example 19 | bal. | 0.93 | 1.0 | 1424 | 2039 | 958 | 53.0 | 97.0 | Good | Good |
| Comparative example 2 | bal. | 0.35 | 1.0 | 1421 | 1978 | 910 | 54.0 | 96.3 | Good | Bad |
| Example 20 | bal. | 0.49 | 1.0 | 1422 | 2019 | 942 | 53.3 | 96.9 | Good | Good |
| Example 21 | bal. | 0.73 | 1.0 | 1423 | 2050 | 967 | 52.8 | 97.1 | Good | Good |
| Example 3 | bal. | 0.94 | 1.0 | 1424 | 2059 | 974 | 52.7 | 97.2 | Good | Good |
| Example 22 | bal. | 1.40 | 1.0 | 1424 | 2055 | 971 | 52.8 | 97.8 | Good | Good |
| Example 23 | bal. | 1.98 | 1.0 | 1409 | 2027 | 948 | 53.2 | 96.3 | Good | Good |

TABLE 1-continued

| | | | | | | | | | |
|---|---|---|---|---|---|---|---|---|---|
| Comparative example 3 | bal. | 2.33 | 1.0 | 1378 | 1996 | 924 | 53.7 | 94.6 | Bad | Good |
| Example 24 | bal. | 0.93 | 1.0 | 1441 | 2004 | 930 | 53.6 | 97.7 | Good | Good |
| Example 25 | bal. | 0.93 | 1.0 | 1435 | 2027 | 948 | 53.2 | 97.4 | Good | Good |
| Example 3 | bal. | 0.93 | 1.0 | 1424 | 2059 | 974 | 52.7 | 97.2 | Good | Good |
| Example 26 | bal. | 0.93 | 1.0 | 1418 | 2078 | 989 | 52.4 | 96.9 | Good | Good |
| Example 27 | bal. | 0.93 | 1.0 | 1409 | 2093 | 1002 | 52.1 | 96.3 | Good | Good |
| Comparative example 4 | bal. | 0.93 | 1.0 | 1391 | 2105 | 1012 | 51.9 | 95.8 | Bad | Good |
| Example 3 | bal. | 0.93 | 1.0 | 1424 | 2059 | 974 | 52.7 | 97.2 | Good | Good |
| Example 28 | bal. | 0.93 | 1.0 | 1403 | 2233 | 1124 | 49.7 | 96.8 | Good | Good |

TABLE 2

| | Nd (mass %) | Dy (mass %) | Tb (mass %) | TRE (mass %) | B (mass %) | Al (mass %) | Ga (mass %) | Cu (mass %) | Mn (mass %) | Zr (mass %) | Co (mass %) |
|---|---|---|---|---|---|---|---|---|---|---|---|
| Example 3 | 30.27 | 0.00 | 0.78 | 31.05 | 0.95 | 0.23 | 0.08 | 0.27 | 0.04 | 0.40 | 0.43 |
| Example 29 | 30.27 | 0.00 | 0.62 | 30.89 | 0.95 | 0.23 | 0.08 | 0.23 | 0.04 | 0.40 | 0.43 |
| Example 30 | 30.27 | 0.00 | 0.47 | 30.74 | 0.95 | 0.23 | 0.08 | 0.18 | 0.04 | 0.40 | 0.43 |
| Example 31 | 30.27 | 0.00 | 0.31 | 30.58 | 0.95 | 0.23 | 0.08 | 0.14 | 0.04 | 0.40 | 0.43 |

| | Fe (mass %) | Zr/Co | Tb coating amount (mass %) | Br at room temp (mT) | HcJ at room temp (kA/m) | HcJ at 147° C. (kA/m) | Demagnetization factor (%) | Hk/HcJ at room temp (%) | Magnetic properties | Corrosion resistance |
|---|---|---|---|---|---|---|---|---|---|---|
| Example 3 | bal. | 0.93 | 1.0 | 1424 | 2059 | 974 | 52.7 | 97.2 | Good | Good |
| Example 29 | bal. | 0.93 | 0.8 | 1430 | 2004 | 930 | 53.6 | 97.6 | Good | Good |
| Example 30 | bal. | 0.93 | 0.6 | 1446 | 1904 | 854 | 55.1 | 97.8 | Good | Good |
| Example 31 | bal. | 0.93 | 0.4 | 1454 | 1807 | 784 | 56.6 | 97.8 | Good | Good |

TABLE 3

| | Nd (mass %) | Pr (mass %) | Dy (mass %) | Tb (mass %) | TRE (mass %) | B (mass %) | Al (mass %) | Ga (mass %) | Cu (mass %) | Mn (mass %) |
|---|---|---|---|---|---|---|---|---|---|---|
| Example 3 | 30.27 | 0.00 | 0.00 | 0.78 | 31.05 | 0.95 | 0.23 | 0.08 | 0.27 | 0.04 |
| Example 32 | 24.56 | 5.72 | 0.00 | 0.77 | 31.05 | 0.95 | 0.23 | 0.08 | 0.27 | 0.04 |
| Example 33 | 23.56 | 6.72 | 0.00 | 0.78 | 31.06 | 0.95 | 0.23 | 0.08 | 0.27 | 0.04 |
| Example 34 | 22.68 | 7.60 | 0.00 | 0.77 | 31.05 | 0.95 | 0.23 | 0.08 | 0.27 | 0.04 |

| | Zr (mass %) | Co (mass %) | Fe (mass %) | Zr/Co | Tb coating amount (mass %) | Br (mT) | HcJ (kA/m) | HcJ at 147° C. (kA/m) | Hk/HcJ (%) | Corrosion resistance |
|---|---|---|---|---|---|---|---|---|---|---|
| Example 3 | 0.40 | 0.43 | bal. | 0.93 | 1.0 | 1424 | 2059 | 974 | 97.2 | Good |
| Example 32 | 0.40 | 0.43 | bal. | 0.93 | 1.0 | 1422 | 2077 | 970 | 97.1 | Good |
| Example 33 | 0.40 | 0.43 | bal. | 0.93 | 1.0 | 1419 | 2083 | 968 | 97.1 | Good |
| Example 34 | 0.40 | 0.43 | bal. | 0.93 | 1.0 | 1418 | 2088 | 966 | 97.0 | Good |

Table 1 shows the examples and the comparative examples which were performed under the same conditions except for changing the composition of the R-T-B based permanent magnet. The examples satisfying the composition of specific range had good magnetic properties and corrosion resistance. The comparative examples having the composition which did not satisfy the specific range had bad magnetic properties or corrosion resistance. Regarding the demagnetization factor, there was no significant difference observed between the examples and the comparative examples.

Table 2 shows the examples of the sintered body having the same composition but a different Tb coating amount. According to Table 2, as the Tb coating amount increased, Br tended to decrease, HcJ tended to increase, and Hk/HcJ tended to decrease. The corrosion resistance was maintained good even when the Tb coating amount was changed.

Table 3 shows the examples in which part of Nd of Example 3 was substituted to Pr. According to Table 3, as Pr content increased, HcJ at room temperature increased but HcJ at 147° C. tended to decrease.

For all of the examples and the comparative examples of the R-T-B based permanent magnet, the Tb concentration distribution was measured using an electron probe micro analyzer (EPMA), and it was confirmed that Tb concentration had a concentration distribution which decreased from outer side to inner side.

NUMERICAL REFERENCES

1 . . . R-T-B based permanent magnet

What is claimed is:

1. An R-T-B based permanent magnet in which R is a rare earth element including one or more selected from Nd and Pr and one or more selected from Dy and Tb, T is a combination of Fe and Co, and B is boron, wherein the R-T-B based permanent magnet further includes Zr,
a total content of Nd, Pr, Dy, and Tb is 30.00 mass % to 32.20 mass %,
Co content is 0.30 mass % to 1.30 mass %,
Zr content is 0.21 mass % to 0.85 mass %, and
B content is 0.90 mass % to 1.02 mass % with respect to 100 mass % of the R-T-B based permanent magnet, and
Zr/Co ratio is 0.48 or more and 1.40 or less.

2. The R-T-B based permanent magnet according to claim 1 further including Cu and Cu content is 0.10 mass % to 0.55 mass %.

3. The R-T-B based permanent magnet according to claim 1 further including Mn and Mn content is 0.02 mass % to 0.10 mass %.

4. The R-T-B based permanent magnet according to claim 1 further including Al and Al content is 0.07 mass % to 0.35 mass %.

5. The R-T-B based permanent magnet according to claim 1 further including Ga and Ga content is 0.02 mass % to 0.15 mass %.

6. The R-T-B based permanent magnet according to claim 1, wherein a content of a heavy rare earth element is 2.0 mass % or less.

7. The R-T-B based permanent magnet according to claim 1 having a concentration gradient of a heavy rare earth element decreasing from a surface towards an inside of the magnet.

8. The R-T-B based permanent magnet according to claim 1, wherein the Zr/Co ratio is 0.73 or more and 1.40 or less.

9. The R-T-B based permanent magnet according to claim 1, wherein the Zr content is 0.25 mass % or more and 0.65 mass % or less.

10. The R-T-B based permanent magnet according to claim 1, wherein the Zr content is 0.31 mass % or more and 0.60 mass % or less.

11. The R-T-B based permanent magnet according to claim 1, wherein the Co content is 0.30 mass % or more and 0.43 mass % or less.

* * * * *